United States Patent [19]

Zerfass et al.

[11] Patent Number: 4,681,800
[45] Date of Patent: Jul. 21, 1987

[54] IMPREGNATED, SOFT, FLAT GASKET AND MANUFACTURING METHOD

[75] Inventors: Hans-Rainer Zerfass, Burscheid; Franz-Josef Giesen, Odenthal, both of Fed. Rep. of Germany

[73] Assignee: Goetze AG, Burscheid, Fed. Rep. of Germany

[21] Appl. No.: 819,729

[22] Filed: Jan. 17, 1986

[30] Foreign Application Priority Data

Jan. 17, 1985 [DE] Fed. Rep. of Germany ....... 3501361
Jun. 13, 1985 [DE] Fed. Rep. of Germany ....... 3521138

[51] Int. Cl.$^4$ ................................................ B32B 5/16
[52] U.S. Cl. .................................. 428/283; 156/272.2; 156/272.8; 156/275.5; 277/235 B; 277/DIG. 6; 428/284; 428/285; 428/290; 428/391; 428/447
[58] Field of Search ............... 156/272.2, 272.8, 275.5; 428/290, 391, 446, 266, 447, 405, 429, 283, 284, 285; 277/235 B, DIG. 6

[56] References Cited

U.S. PATENT DOCUMENTS

| | | | |
|---|---|---|---|
| 4,448,840 | 5/1984 | Matsushita | 428/266 |
| 4,474,857 | 10/1984 | Vaughn | 428/446 |
| 4,477,514 | 10/1984 | Gee et al. | 428/290 |
| 4,530,874 | 7/1985 | Hendry et al. | 428/446 |

*Primary Examiner*—James J. Bell
*Attorney, Agent, or Firm*—Spencer & Frank

[57] ABSTRACT

An impregnated, soft, flat sealing gasket and a method of manufacturing same which includes the steps of impregnating a fiber mat with a liquid, cross-linkable silicone impregnating agent which includes a cross-linking agent which forms radicals under the influence of heat; heating the silicone-impregnated fiber mat to cause at least partial cross-linking of the silicone impregnating agent; and irradiating the impregnated fiber mat with high energy radiation to cause cross-linking of the silicone impregnating agent present therein, whereby the silicone impregnating agent present in surface regions of the flat sealing gasket is cross-linked to a greater degree than obtainable by thermal treatment alone.

25 Claims, No Drawings

IMPREGNATED, SOFT, FLAT GASKET AND MANUFACTURING METHOD

BACKGROUND OF THE INVENTION

1. Field of the Invention

The present invention relates to an impregnated soft, flat sealing gasket, particularly for use as a cylinder head gasket or an exhaust flange gasket in internal-combustion engines, and a manufacturing method therefor. Such gaskets are composed of a non-woven fiber mat which may be metal-reinforced and which is impregnated with an addition cross-linkable silicone resin that is cross-linked in its final state.

2. Discussion of the Prior Art

Modern soft gaskets for use as cylinder head gaskets or exhaust flange gaskets for internal-combustion engines, are generally composed of non-woven fiber mats comprised of organic fibers, inorganic fibers, synthetic fibers or mixtures thereof and are impregnated with liquid, cross-linkable impregnating agents. The fiber mats are impregnated primarily so as to increase their strength, improve their media resistance and increase their sealing efficiency. The non-woven fiber mats may be further strengthened or reinforced with metal inserts imbedded in the interior. The impregnating agent is subsequently cross-linked in the finished gasket, preferably by the use of heat.

Preferred prior art impregnating agents are primarily solvent-free, liquid polybutadienes, polyacrylates or systems including isocyanates or epoxides, such as those disclosed in U.S. Pat. No. 3,970,322. These impregnating agents, which may include peroxide or sulfur cross-linking agents, thermally cross-link in the finished gasket without emitting volatile substances which might bloat the soft material.

In their final, cross-linked state, these known impregnating agents are more or less hard and brittle, however, so that the impregnated gaskets do not have sufficient plasticity and are not usable for their intended function. For that reason, the impregnating agents are generally only partially cross-linked so that the gaskets retain their shape, but are still plastically or elastically deformable and able to conform to the uneven surfaces to be sealed when installed. The final cross-linking of the impregnating agent then takes place after installation due to the operating heat of the engine.

Partially cross-linked impregnating agents, however, still contain relatively large numbers of reactive groups which, when stored over long periods of time, continue to cross-link in an uncontrolled manner due to aging and environmental influences and thus cause the gaskets to harden. After long periods of storage, such hardened gaskets can no longer be used and therefore, special measures must be taken to protect partially cross-linked gaskets to be stored against further cross-linking during storage. For that reason, the search continues for suitable, substantially solvent-free impregnating agents which have an improved storage life.

Silicone resins have recently become known which are addition cross-linkable in their liquid, uncross-linked state. Polymethylvinyl silicones and silicone acrylates are examples of silicone resins, which, with the addition of platinum salt catalysts, thermally cross-link into elastically deformable or storable products. Manufacturers of such systems, however, caution the user in their product information that the ability of the formulated, cross-linkable system to cross-link sufficiently requires that the system remain free of amines, sulfur compounds and sulfur emitting substances so that the catalyst will not be poisoned.

According to German Offenlegungsschrift (published non-examined application) No. 3,245,664, silicone resins which addition cross-link under the influence of a catalyst have been used as impregnating agents for cylinder head gaskets. For gasket applications, the fiber mats themselves must be free of amines, sulfur compounds or sulfur donors in order to prevent poisoning of the catalyst. Since fiber mats generally contain natural fibers, which may be organic or inorganic, and vulcanizable latex binders, which contain the usual rubber additives, fiber mats that are free of catalyst toxins can be manufactured only at great expense. Additionally, the impregnating agent baths are mixtures of the liquid silicone resin starting composition and a platinum salt catalyst and can be used only for a limited period of time, e.g., for 16 hours as disclosed in German Offenlegungsschrift No. 3,245,664. However, baths with limited potlives cannot be used to economically mass produce cylinder head gaskets.

SUMMARY OF THE INVENTION

It is therefore an object of the present invention to provide silicone resin impregnated, soft, flat gaskets which are easy and economical to manufacture. It is a particular object of the invention to permit the use of radically cross-linkable liquid silicone systems for the impregnation of gaskets in an economical manner and with little suceptibility to malfunction.

This is accomplished in a gasket composed of a soft, flat non-woven fiber mat which is impregnated with a radically cross-linkable silicone according to the present invention by providing a two-stage cross-linking. In a first embodiment, a surface region or regions of the impregnated material are cross-linked by high energy radiation and the entire cross-section thereof is subsequently further cross-linked thermally under the influence of radical formers. In a second embodiment, the entire cross-section is thermally cross-linked by the influence of radical formers and the surface region or regions are subsequently further cross-linked by high energy radiation.

Surprisingly, it has been found that liquid silicone impregnating agents including a suitable radical forming additive keep at room temperature for practically an unlimited time without changing their characteristics. In this way, it is possible to produce these impregnating agent starting compositions in large quantities and gaskets can be impregnated economically and without losses, preferably by immersion, with such a starting compositions without the necessity of frequently recharging the impregnating agent baths.

During thermal cross-linking of the impregnating agent in the impregnated fiber mat, radical-forming cross-linking agents form radicals which induce cross-linking of the silicone impregnating agent. It has been discovered that the cross-linking of the impregnating agent is interfered with at the surfaces of the impregnated fiber mat, evidently due to the influence of ambient oxygen, as indicated by the fact that the mat remains sticky in its surface regions. Cross-linking of the impregnating agent present at the surfaces or surface regions with high energy radiation, as provided by the present invention, eliminates this stickiness which is undesirable, especially during assembly.

The liquid silicone material employed as impregnating agent is preferably a polyvinyl silicone, a silicone acrylate or mixtures thereof, and the polyvinyl silicone is preferably a polymethylvinyl silicone. The radical-forming cross-linking agent is preferably a commercially available organic peroxide in quantities of preferably from 2 to 5 percent by weight based on the weight of the total impregnating agent starting composition. The silicone starting composition may additionally contain from 2 to 5 weight percent of a photoinitiator which further improves the final cross-linking of the impregnating agent in the surface regions by high energy radiation, preferably UV radiation.

DESCRIPTION OF THE PREFERRED EMBODIMENTS

To produce the gasket according to the present invention, a gasket material selected from the group consisting of organic fibers, inorganic fibers, synthetic fibers and mixtures thereof is prepared and a fiber mat formed from the gasket material. A silicone starting composition is first produced to which is added preferably from 2 to 5 weight percent of the radical former additive. The fiber mat is impregnated with this starting composition according to a known process, such as immersion, brushing or spraying. Thereafter, the impregnating agent is cross-linked in two stages; initially by heating in a furnace at temperatures between 200° and 300° C. and thereafter by irradiating the surfaces of both sides of the impregnated fiber mat with preferably a UV lamp. Alternately, the sequence may be reversed.

It has also been discovered that the impregnated fiber mats can be coated between the furnace hardening or cross-linking stage and the UV hardening or cross-linking stage, with the result that the coating layer adheres particularly well to the impregnated fiber mat after the UV hardening process. Preferred coating layers are UV-hardenable polymers which cross-link together with the sticky impregnating agent during the UV hardening process.

However, it is also within the scope of the present invention to apply, after the furnace cross-linking stage, solid particle substances, preferably powdered to fine grained substances, having predetermined properties. Preferred for their good lubricating properties are Teflon TM powder or molybdenum sulfide. Preferred for their anti-adhesion properties are metal soaps, useful with or without binder additives. The solid particulate substances are firmly bonded to the impregnated fiber mat during the UV-cross-linking process, whereby the finished sealing gasket is provided with optimum sliding or non-stick properties, respectively.

The additional polymer or solid particulate coatings may be applied to the entire surface area of the impregnated fiber mat or parts thereof, and may be applied in variable thicknesses. Such coatings provide a cover on the mat which increases the sealing pressure in a known manner in regions under particular stress when the coating material is applied to be thicker in predetermined areas. Metal sheets may also be applied to some of the sticky gasket surfaces so as to function as covers thereon and locally increase the sealing pressure in use while simultaneously adhering well.

The present invention provides a gasket which, due to the silicone impregnation, has great strength, good elastic deformability during installation and resistance to high temperatures and the various media to be sealed. Additionally, the gasket can be stored for practically unlimited times without its characteristics changing, thereby eliminating the need for special measures.

The use of radically cross-linkable silicones enables the gasket to be mass produced cost-effectively and economically. Baths of the impregnating agent starting compositions can be used over long periods of time without concern that the cross-linking of the impregnating agent will be interfered with by catalyst poisoning, which results in even greater cost-effectiveness.

Thus, these impregnating agents can be used to advantage for any type of soft-material gasket regardless of the consistency of the gasket material of the fiber mat to be impregnated. Thermal cross-linking of the impregnating agent in the fiber mat, during which the surfaces of the impregnated fiber mat initially remain sticky, can be controlled, as previously taught, or can be utilized to particular advantage for firmly bonding additionally applied coatings and/or covers to the impregnated gasket.

The invention will now be described in greater detail with the aid of an example.

The impregnating agent starting composition is a liquid polysilicone acrylate which contains 4 weight percent of dicumyl peroxide, based on the weight of the total starting composition, as the cross-linking agent.

This silicone composition is used to impregnate, by immersion, metal-reinforced asbestos fiber mats for cylinder head gaskets so as to attain a pore fill of 80 volume percent.

The impregnating agent in the impregnated fiber mats is cross-linked for 2 minutes at 270° C. in a furnace and is immediately afterwards irradiated for 2 minutes by a UV lamp having a power of 80 Watt/cm$^2$. The surfaces on both sides of the impregnated fiber mat were irradiated.

The behavior of the installed gasket in operation was tested. The values obtained for deformation behavior, sealing capability and strength were comparable to those of conventional sealing gaskets. Temperature resistance and resistance to the media to be sealed were noticeably improved over conventional seals.

An aging test performed on the finished sealing gasket after 6 months of storage at 70° C. did not reveal any significant changes in the operational behavior.

It will be understood that the above description of the present invention is susceptible to various modifications, changes and adaptations, and the same are intended to be comprehended within the meaning and range of equivalents of the appended claims.

What is claimed is:

1. In an impregnated soft, flat sealing gasket, including a fiber mat and a silicone impregnating agent; the improvement wherein the silicone impregnating agent includes a cross-linking agent which forms radicals under the influence of heat and the silicone impregnating agent has been at least partly cross-linked thereby, and wherein the silicone impregnating agent has been cross-linked in at least one surface region of said flat sealing gasket under the influence of high energy radiation to a greater degree than obtainable by thermal treatment alone.

2. The flat sealing gasket as defined in claim 1, wherein the silicone impregnating agent is comprised of a silicone material selected from the group consisting of polyvinyl siloxanes, silicone acrylates, and mixtures thereof.

3. The flat sealing gasket as defined in claim 1, wherein the gasket further comprises a layer of a coating composition affixed to one or both surface regions of the impregnated fiber mat prior to cross-linking thereof by radiation and bonded thereto when the impregnating agent present in the surface regions is cross-linked by radiation.

4. The flat sealing gasket as defined in claim 3, wherein the coating composition is comprised of a substance selected from the group consisting of radiation cross-linkable polymers, solid particulate substances, and mixtures thereof.

5. The flat sensing gasket as defined in claim 1, wherein the gasket further comprises a cover consisting of sheet metal and affixed to a predetermined portion of one or both surface regions of the impregnated fiber mat prior to cross-linking thereof and bonded thereto when the impregnating agent is cross-linked.

6. An impregnated, soft, flat sealing gasket produced by a method of manufacturing comprising the steps of:
impregnating a fiber mat with a liquid, cross-linkable silicone impregnating agent which includes a cross-linking agent which forms radicals under the influence of heat;
heating the silicone-impregnated fiber mat to cause at least partial cross-linking of the silicone impregnating agent; and
irradiating the impregnated fiber mat with high energy radiation to cause cross-linking of the silicone impregnating agent present therein, whereby the silicone impregnating agent present in surface regions of the flat sealing gasket is cross-linked to a greater degree than obtainable by thermal treatment alone.

7. The flat sealing gasket according to claim 6, wherein the impregnating agent is comprised of a silicone material selected from the group consisting of polyvinyl siloxanes, silicone acrylates, and mixtures thereof.

8. The flat sealing gasket according to claim 6, wherein the impregnating agent contains from 2 to 5 weight percent organic peroxides as radical formers.

9. A method of manufacturing an impregnated, soft, flat sealing gasket comprising the steps of:
impregnating a fiber mat with a liquid, cross-linkable silicone impregnating agent which includes a cross-linking agent which forms radicals under the influence of heat;
heating the silicone-impregnated fiber mat to cause at least partial cross-linking of the silicone impregnating agent; and
irradiating the impregnated fiber mat with high energy radiation to cause cross-linking of the silicone impregnating agent present therein, whereby the silicone impregnating agent present in surface regions of the flat sealing gasket is cross-linked to a greater degree than obtainable by thermal treatment alone.

10. The method according to claim 9, wherein the impregnating agent is comprised of a silicone material selected from the group consisting of polyvinyl siloxanes, silicone acrylates, and mixtures thereof.

11. The method according to claim 9, wherein the impregnating agent contains from 2 to 5 weight percent organic peroxides as radical formers.

12. The method according to claim 9, wherein the high energy radiation is UV radiation.

13. The method according to claim 9, wherein the impregnating agent contains from 2 to 5 weight percent of a photoinitiator.

14. The method according to claim 9, wherein the irradiating step precedes the heating step.

15. The method according to claim 9, wherein the heating step precedes the irradiating step.

16. The method according to claim 15, further comprising the step of applying a coating composition to one or both surface regions of the impregnated fiber mat prior to cross-linking thereof by irradiation, whereby a bonded layer comprised of said coating composition is provided subsequent to the irradiation step.

17. The method according to claim 16, wherein the coating composition is comprised of a substance selected from the group consisting of radiation cross-linkable polymers, solid particulate substances, and mixtures thereof.

18. The method according to claim 9, further comprising the step of applying a cover consisting of sheet metal to a predetermined portion of one or both surface regions of the impregnated fiber mat prior to cross-linking thereof, whereby a bonded cover comprised of sheet metal is provided subsequent to cross-linking.

19. The flat sealing gasket according to claim 12, wherein the high energy radiation is UV radiation.

20. The flat sealing gasket according to claim 13, wherein the impregnating agent contains from 2 to 5 weight percent of a photoinitiator.

21. The flat sealing gasket according to claim 14, wherein the irradiating step precedes the heating step.

22. The flat sealing gasket according to claim 15, wherein the heating step precedes the irradiating step.

23. The flat sealing gasket according to claim 16, further comprising the step of applying a coating composition to one or both surface regions of the impregnated fiber mat prior to cross-linking thereof by irradiation, whereby a bonded layer comprised of said coating composition is provided subsequent to the irradiation step.

24. The flat sealing gasket according to claim 17, wherein the coating composition is comprised of a substance selected from the group consisting of radiation crosslinkable polymers, solid particulate substances, and mixtures thereof.

25. The flat sealing gasket according to claim 18, further comprising the step of applying a cover consisting of sheet metal to a predetermined portion of one or both surface regions of the impregnated fiber mat prior to cross-linking thereof, whereby a bonded cover comprised of sheet metal is provided subsequent to cross-linking.

* * * * *